US007600388B2

(12) United States Patent
Vestal

(10) Patent No.: US 7,600,388 B2
(45) Date of Patent: Oct. 13, 2009

(54) REFRIGERATOR WITH AN AIR FILTER/FRESHENER SYSTEM

(75) Inventor: William James Vestal, Milan, IL (US)

(73) Assignee: Maytag Corporation, Benton Harbor, MI (US)

( * ) Notice: Subject to any disclaimer, the term of this patent is extended or adjusted under 35 U.S.C. 154(b) by 382 days.

(21) Appl. No.: 11/489,561

(22) Filed: Jul. 20, 2006

(65) Prior Publication Data

US 2008/0016898 A1     Jan. 24, 2008

(51) Int. Cl.
*F25B 39/04* (2006.01)
(52) U.S. Cl. ............... 62/89; 62/183; 55/DIG. 34; 95/23; 96/422
(58) Field of Classification Search ............... 62/331, 62/126, 317, 183, 507, 89; 95/23, 14, 15, 95/19; 454/233; 55/DIG. 34; 96/417, 420, 96/421, 422
See application file for complete search history.

(56) References Cited

U.S. PATENT DOCUMENTS

| 4,047,393 | A | | 9/1977 | Hanson et al. |
| 5,115,644 | A | * | 5/1992 | Alsenz ................. 62/181 |
| 6,347,526 | B1 | | 2/2002 | Ledbetter |
| 6,454,841 | B1 | | 9/2002 | Kaiser |
| 6,736,885 | B2 | | 5/2004 | Kaiser |
| 2004/0139763 | A1 | * | 7/2004 | Jeong et al. ............ 62/448 |
| 2006/0260341 | A1 | * | 11/2006 | Meyvis ................. 62/331 |
| 2007/0068511 | A1 | * | 3/2007 | Bachinsky et al. ...... 126/503 |
| 2007/0227168 | A1 | * | 10/2007 | Simmons ............... 62/229 |
| 2008/0000349 | A1 | * | 1/2008 | Pape et al. .............. 95/23 |
| 2008/0066479 | A1 | * | 3/2008 | Butler et al. ............ 62/183 |

FOREIGN PATENT DOCUMENTS

| JP | 402115679 | 4/1990 |
| JP | 403001079 | 1/1991 |
| JP | 403207979 | 9/1991 |
| JP | 404174276 | 6/1992 |
| JP | 2000259932 | 9/2000 |
| JP | 2002090032 | 3/2002 |
| JP | 2003083666 | 3/2003 |

* cited by examiner

*Primary Examiner*—William E Tapolcai
(74) *Attorney, Agent, or Firm*—Kirk W. Goodwin; Diederiks & Whitelaw PLC

(57) ABSTRACT

A refrigerator incorporates an air filter for filtering an airflow passing along at least one refrigeration component into surrounding spaces. The air filter is positioned in an upper machine compartment which houses refrigeration components associated with maintaining temperatures in the refrigerator. At least one sensor is arranged adjacent the air filter to determine a parameter of the air flow. A control, including an air filter analyzer, determines a need for an air filter change based on the sensed parameter. In addition to removing impurities from the airflow, the air filter includes scented media which adds fragrance to the airflow.

19 Claims, 2 Drawing Sheets

REFRIGERATOR WITH AN AIR FILTER/FRESHENER SYSTEM

BACKGROUND OF INVENTION

1. Field of Invention

The present invention pertains to the art of refrigerators and, more particularly, to a refrigerator including an air filter for removing impurities from air in spaces surrounding the refrigerator.

2. Discussion of Prior Art

In general, a refrigerator includes a freezer compartment for maintaining foodstuffs at or below freezing, and a fresh food compartment for maintaining foodstuffs in a temperature zone between ambient and freezing temperatures. A typical refrigerator includes a refrigeration system having a compressor, a condenser coil, a condenser fan, an evaporator coil, and an evaporator fan. Refrigerators are typically located in kitchens and operate continuously, employing cycles or on and off periods, to establish and maintain selected temperatures in the freezer and fresh food compartments.

Over time, the kitchen has become a focal point for many families. Families cook, eat and, often times, gather to discuss daily events or plans in the kitchen. Children sit and do homework or read at the kitchen table while their parents prepare meals. Regardless of the reason, in today's society, consumers spend considerable time in the kitchen. Unfortunately, kitchens are often filled with fumes and/or odors associated with cooking, collected garbage and the like. In order to combat this problem and make the kitchen a more desirable gathering place, consumers employ dedicated ventilation systems, portable air filtration devices or simply open kitchen windows. While each of the above solutions is effective to one degree or another, not every kitchen is provided with a ventilation system, portable air filters can take up valuable countertop or floor space and, depending upon the time of year, it is not always feasible or practical to open kitchen windows.

Therefore, based on the above, there exists a need for an air filtration system for kitchen areas. More specifically, there exists a need for an air filtration system that is incorporated into an existing kitchen appliance, in particular an appliance that operates continuously, so as to be readily employed in a kitchen without requiring significant changes or utilizing valuable countertop space.

SUMMARY OF THE INVENTION

A refrigerator constructed in accordance with the present invention includes a cabinet having defined therein at least one refrigerated compartment. The refrigerator also includes a machine compartment for housing various refrigeration components that establish and maintain a selected temperature in the at least one refrigerated compartment. The machine compartment is preferably positioned above the at least one refrigerated compartment and includes a plurality of vents that allow an airflow to pass from a surrounding room into the machine compartment and for the airflow to pass from the machine compartment back into the surrounding room. In accordance with the invention, an air filter is positioned adjacent the refrigeration component to condition the airflow passing therethrough.

In further accordance with the invention, the air filter is positioned downstream from one of the refrigeration components, preferably a condenser. The condenser includes an air intake for receiving the air flow and an air outlet that allows the airflow to pass from the condenser. With this arrangement, the air filter is positioned adjacent the air outlet of the condenser to filter the airflow passing back into the surrounding area. In addition, a sensor is positioned adjacent the air filter to detect a change in state of a parameter of the airflow passing through the air filter. The sensor can detect a change in temperature or a change in pressure, either of which can be used to indicate a need to change or clean the air filter. In addition, the need to change the air filter can be signaled based on the passage of a prescribed time period.

In accordance with one aspect of the invention, the sensor provides an output to an indicator which presents a consumer with a visual indication that the air filter requires changing. Finally, in addition to removing impurities from the airflow, the air filter can also serve as a deodorizer, adding a fragrance to the airflow passing from the machine compartment back into the surrounding area.

Additional objects, features and advantages of the invention will become more readily apparent from the following detailed description of a preferred embodiment of the invention when taken in conjunction with the drawings wherein like reference numerals refer to corresponding parts in the several views.

DETAILED DESCRIPTION OF THE INVENTION

Figure 1:
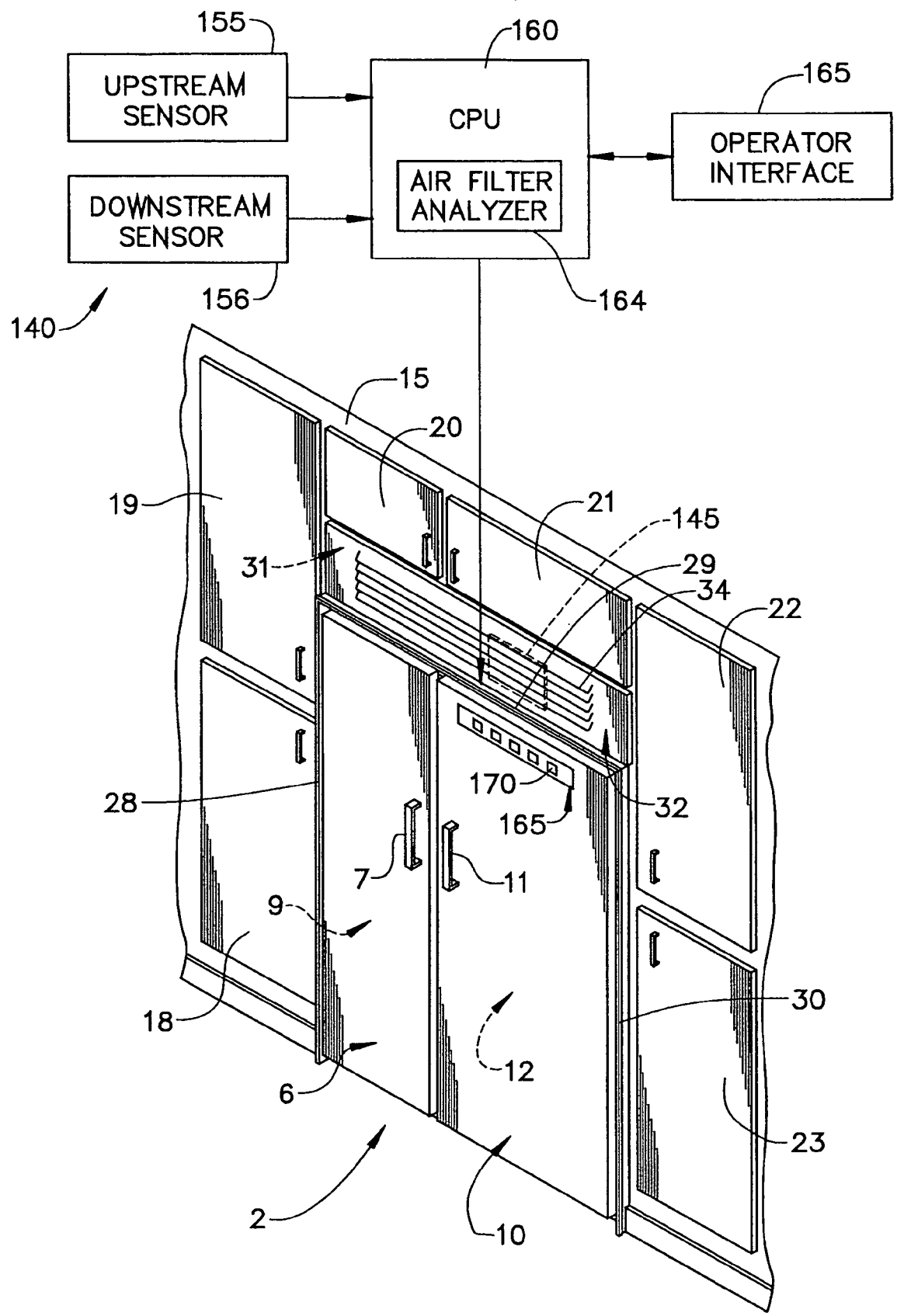
FIG. 1 is an upper right perspective view of a refrigerator incorporating an air filter system constructed in accordance with the present invention.

With initial reference to FIG. 1, a refrigerator constructed in accordance with the present invention is generally indicated at 2. In the embodiment shown, refrigerator 2 includes a cabinet (not labeled) to which is mounted a freezer door 6 having an associated handle 7 that selectively provides access to a freezer compartment 9. Also shown is a fresh food door 10 having an associated handle 11 that selectively provides access to a fresh food compartment 12. Refrigerator 2 is of the recessed type such that, essentially, only freezer and fresh food doors 6 and 10 project forward of a wall 15. The remainder of refrigerator 2 is recessed within wall 15 in a manner similar to that of a plurality of surrounding cabinets 18-23. Refrigerator 2 also includes a plurality of peripheral trim pieces 28-30 that provide an aesthetic interface between refrigerator 2 and cabinets 18-23.

As will be described more fully below, refrigerator 2 is preferably designed with main components of a refrigeration system positioned in an upper machine compartment 31 located behind an access panel 32. As shown, access panel 32 is provided with a plurality of vent slots 34 that enable air to flow into and out from machine compartment 31. The overall construction of refrigerator cabinet 4 does not form part of the present invention and thus will not be described more fully. For additional details of the overall construction of cabinet 4, reference is made to U.S. Pat. No. 6,997,530 entitled "Fastening System for Appliance Cabinet Assembly" incorporated herein by reference.

Figure 2:
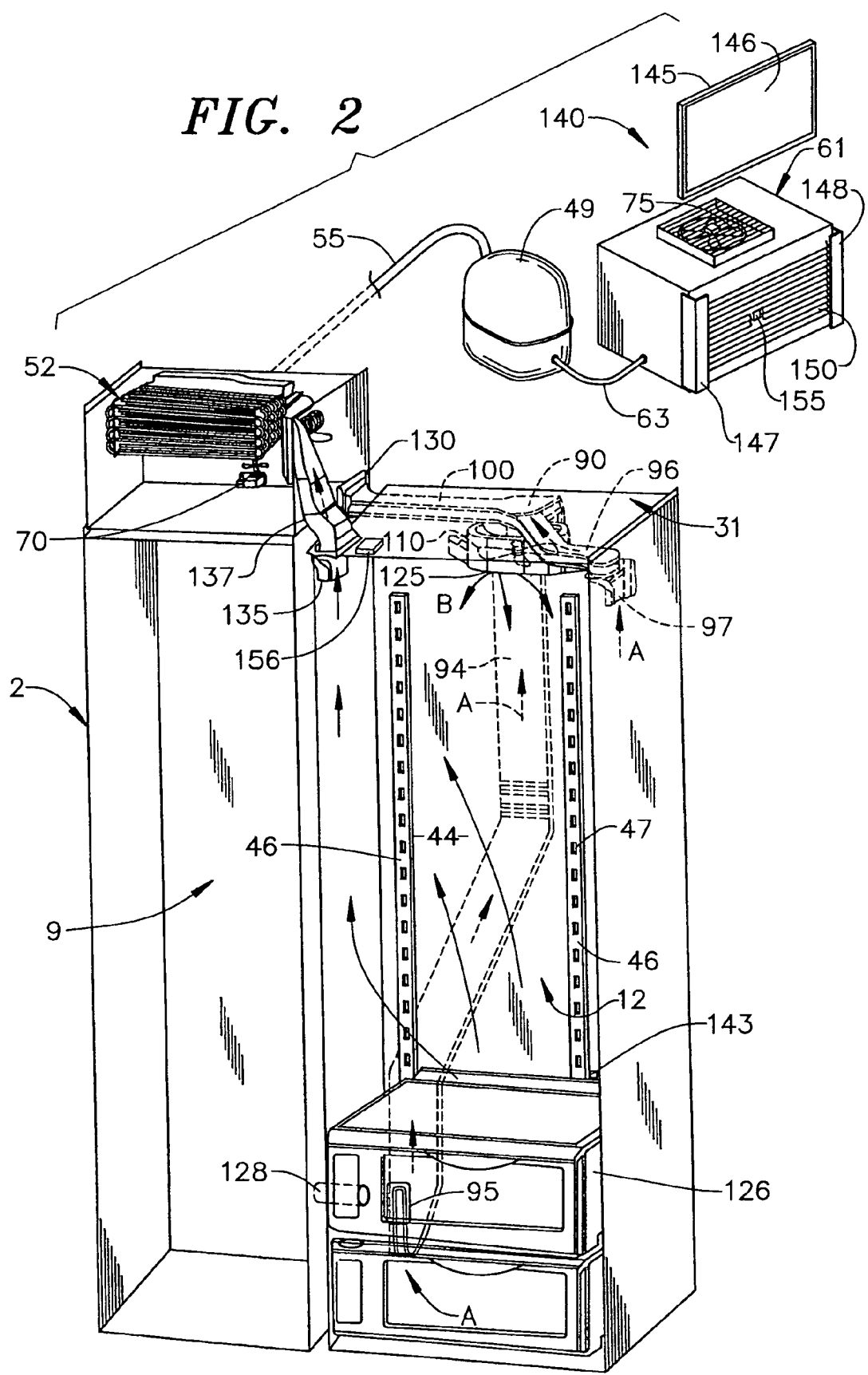
FIG. 2 is an exploded view of the refrigerator of FIG. 1 showing the various components of the air filter system of FIG. 1.

As best shown in FIG. 2, arranged on a rear wall 44 of fresh food compartment 12 are a pair of elongated metal shelf rails 46. Each shelf rail 46 is provided with a plurality of shelf support points, preferably in the form of slots 47, adapted to accommodate a plurality of vertically adjustable, cantilevered shelves (not shown) in a manner known in the art. Since the manner in which such shelves are supported can vary and the shelves are not considered part of the present invention, the shelves have not been depicted for the sake of clarity of the drawings and will not be discussed further here.

In accordance with the embodiment shown, components of the refrigeration system employed for maintaining selected temperatures in refrigerator 2 are positioned in machine compartment 31. Components of the refrigeration system include a compressor 49 which is operatively connected to both an evaporator 52 through conduit 55, and a condenser 61 through conduit 63. Arranged adjacent to evaporator 52 is an evaporator fan 70 adapted to provide an airflow to evaporator 52. Similarly, arranged adjacent to condenser 61 is a condenser fan 75 which is adapted to provide an airflow across condenser 61.

In addition to the aforementioned components, refrigerator 2 includes an air manifold 90 for use in directing a cooling airflow from freezer compartment 9 into fresh food compartment 12. Air manifold 90 includes a first recirculation duct 94 having an inlet 95 exposed in a lower portion of fresh food compartment 12, a second recirculation duct 96 having an inlet 99 exposed at an upper portion of fresh food compartment 12, and an intake duct 100 establishing an air path for a flow of fresh cooling air from freezer compartment 9 into manifold 90. Arranged in fluid communication with air manifold 90 is a fresh food stirring fan 110. Stirring fan 110 is adapted to receive a combined flow of air from recirculation ducts 94 and 96, as well as intake duct 100, and to disperse the combined flow of air into the fresh food compartment 12.

Stirring fan 110 draws in a flow of air, which is generally indicated by arrows A, through inlets 95 and 99 of ducts 94 and 96, and intake duct 100, while subsequently exhausting the combined flow of cooling air, represented by arrow B, through outlet 125. Most preferably, outlet 125 directs the air flow in various directions in order to generate a desired flow pattern based on the particular configuration of fresh food compartment 12 and any additional structure provided therein. The exact positioning of inlets 95 and 97 also depend on the particular structure provided. In one preferred embodiment, inlet 95 of duct 94 is located at a point behind at least one food storage bin 126 arranged in a bottom portion of fresh food compartment 12. The air flow past storage bin 126 is provided to aid in maintaining freshness levels of food contained therein. For this purpose, an additional passage 128 leading from freezer compartment 9 into fresh food compartment 12 can also be provided.

In order to regulate the amount of cooling air drawn in from freezer compartment 9, a damper 130 is provided either at an entrance to or within intake duct 100. When the cooling demand within fresh food compartment 12 rises, damper 130 opens to allow cooling air to flow from freezer compartment 9 to fresh food compartment 12 and, more specifically, into intake duct 100 to manifold 90 and stirring fan 110. A flow of air to be further cooled at evaporator 52 is lead into an intake 135 of a return duct 137. In the embodiment shown, return duct 137 is preferably located in the upper portion of fresh food compartment 12. At this point it should be understood that the overall temperature control system does not form part of the present invention. Instead, a more detailed discussion of the overall operation and arrangement of the temperature control system of refrigerator 2, can be found in commonly assigned U.S. Pat. No. 6,772,601 entitled "Temperature Control System For a Refrigerated Compartment," which is incorporated herein by reference.

In accordance with the invention, refrigerator 2 includes an air filter system 140 having an air filter 145 provided with a filtering media 146. Air filter 145 is preferably positioned directly adjacent to an outlet portion 150 of condenser 61. Of course, it should be readily understood that air filter 145 could be positioned in various locations within machine compartment 31. In any event, air filter 145 is held in place by a pair of L-shaped retainer members 147 and 148 that readily enable replacement of air filter 145 as necessary. That is, L-shaped retainer members 147 and 148 enable air filter 145 to be shifted upward and removed from adjacent condenser 61 and a new air filter 145 arranged in its place. With this arrangement, an airflow passing from condenser 61 must also pass through air filter 145, with filtering media 146 substantially removing any impurities, particles and the like from the airflow. The filtered airflow is then passed from machine compartment 31 into the surrounding room.

In further accordance with the invention, air filter system 140 includes at least one sensor positioned adjacent air filter 145. Preferably, air filter system 140 includes two sensors, a first or up-stream sensor 155 and a second or downstream sensor 156 that measure changes in a parameter of the airflow passing through air filter 145. Each sensor 155, 156 sends a signal representative of a parameter of the airflow to a controller or CPU 160. More specifically, CPU 160 includes an air filter analyzer 164 which determines a difference (if any) between the parameter measured by sensor 155 and the parameter measured by sensor 156. In accordance with one aspect of the invention, sensors 155 and 156 measure a temperature of the airflow. In accordance with another aspect of the invention, sensors 155 and 156 measure a pressure of the airflow. In any event, if the difference in parameters exceeds a predetermined value, CPU 160 sends a signal to an interface 165 mounted to fresh food compartment door 10 indicating that air filter 145 should be replaced.

As shown in FIG. 1, interface 165 includes an air filter status indicator 170, such as a light that is illuminated to notify a customer when it is time to change air filter 145. In the alternative, indicator 170 can take the form of a display that signals a need to change air filter 145 in an alpha or graphic format. In addition to utilizing sensed temperature or pressure parameters, controller 160 could determine a need for a filter change based upon a time parameter of the airflow. For example, CPU 160 could be designed to signal a need for a filter change after the airflow has passed through air filter 145, based on the operation of fan 75, for approximately 3 months.

In accordance with yet another aspect of the invention, in addition to removing impurities, air filter system 140 also preferably adds a pleasant fragrance to the airflow. That is, filtering media 146 of air filter 145 constitutes a scented media such that the airflow passing from machine compartment 31 provides a pleasant fragrance to surrounding areas. In any event, it should be readily understood that the present invention provides air filtration in spaces, preferably kitchen spaces, without requiring dedicated appliances or wasting valuable counter space. Moreover, by incorporating the air filtration system into a refrigerator, surrounding spaces can be substantially, continuously filtered and/or scented without the need for dedicated or additional energy consuming devices.

Although described with reference to preferred embodiments of the invention, it should be readily understood that various changes and/or modifications can be made to the invention without departing from the spirit thereof. For instance, as indicated above, while shown positioned adjacent the condenser, the air filter could be positioned elsewhere in the machine compartment and need not be associated with any particular refrigeration component. That is, the air filter could simply be mounted in cover 32 adjacent all the refrigeration components. It should be further understood that, while two sensors are described, a single sensor detecting a rise/drop in temperature or pressure could also be employed.

In general, the invention is only intended to be limited by the scope of the following claims.

I claim:

1. A refrigerator comprising:
   a fresh food compartment;
   a freezer compartment;
   a machine compartment positioned adjacent the fresh food and freezer compartments, said machine compartment including a cover provided with a plurality of vents formed therein for allowing an airflow to enter the machine compartment from the surrounding room and to pass from inside the compartment to the surrounding room;
   a refrigeration system including a refrigeration component positioned within the machine compartment, said refrigeration component having an air intake and an air outlet;
   an air filter positioned adjacent the air outlet of the refrigeration component such that at least a portion of the airflow entering and passing through said machine compartment flows into the air intake of the refrigeration component, exits the air outlet of the refrigeration component, passes through said air filter and is directed out said plurality of vents; and
   a sensor located adjacent the air filter, said sensor detecting a parameter of the airflow passing through the air filter.

2. The refrigerator according to claim 1, further comprising: a controller operatively connected to the sensor, said controller operating the refrigeration system and including an air filter analyzer portion that determines a need for an air filter change based on signals from the sensor.

3. The refrigerator according to claim 2, further comprising: another sensor mounted adjacent the air filter, said sensor and said another sensor being mounted upstream and downstream of the air filter respectively, said air filter analyzing portion determining a need for a filter change based upon a change in state in the airflow passing though the filter as sensed by the sensor and another sensor.

4. The refrigerator according to claim 3, further comprising: first and second L-shaped brackets for retaining the air filter directly adjacent the refrigeration component.

5. The refrigerator according to claim 3, wherein the refrigeration component is constituted by a condenser.

6. The refrigerator according to claim 5, wherein the sensor is mounted directly to the condenser.

7. The refrigerator according to claim 3, wherein the change in state is constituted by change in temperature of the air flow.

8. The refrigerator according to claim 3, wherein the change in state is constituted by a change in pressure of the air flow.

9. The refrigerator according to claim 3, wherein the air filter analyzer portion determines a need for an air filter change based on a change of state of the airflow passing through the air filter and an elapsed amount of time.

10. The refrigerator according to claim 2, further comprising: an air filter status indicator operatively connected to the controller, said air filter status indicator being activated by the air filter analyzer portion to provide a visual indication of a need to change the air filter.

11. A refrigerator comprising:
    a fresh food compartment;
    a freezer compartment;
    a machine compartment positioned adjacent the fresh food and freezer compartments, said machine compartment including a cover provided with a plurality of vents formed therein for allowing an airflow to enter the machine compartment from the surrounding room and to pass from inside the compartment to the surrounding room;
    a refrigeration system including a refrigeration component positioned within the machine compartment, said refrigeration compartment having an air intake and an air outlet;
    an air filter positioned adjacent one of the air intake and air outlet of the refrigeration component; and
    a sensor located the air filter, said sensor detecting a parameter of an airflow passing through the air filter, wherein the air filter includes a filtering media to remove impurities from the airflow, said filtering media being scented to impart a fragrance to the airflow.

12. A method of operating a refrigerator having a machine compartment including a cover provided with a plurality of vents formed therein for allowing an airflow to enter the machine compartment from a surrounding room and to pass from inside the compartment to the surrounding room, a refrigeration component positioned in the machine compartment and having an air intake and an air outlet, and an air filter positioned adjacent the air outlet of the refrigeration component, said method comprising:
    guiding an airflow into the machine compartment;
    directing at least a portion of the airflow entering and passing through the machine compartment into the air intake of the refrigeration component, with the at least a portion of the airflow exiting the air outlet of the refrigeration component;
    filtering the at least a portion of the airflow passing through the refrigerator component to establish a filtered airflow;
    sensing a parameter of the airflow passing through the air filter; and
    expelling the filtered airflow from the machine compartment out said plurality of vents.

13. The method according to claim 12, further comprising: determining a need for an air filter change based upon the sensed parameter of the airflow passing through the air filter.

14. The method of claim 12, wherein sensing the parameter of the airflow passing through the air filter is constituted by sensing a change in state of the airflow passing through the air filter.

15. The method of claim 14, wherein the sensing the change in state is constituted by determining a change in temperature of an airflow passing into the air filter and an airflow passing out from the air filter.

16. The method of claim 14, wherein the sensing the change in state is constituted by determining a change in pressure of an airflow passing through the air filter.

17. The method of claim 12, further comprising:
    sensing an amount of time air passes through the air filter; and
    indicating a need for a filter change after a predetermined amount of time has passed.

18. The method of claim 12, further comprising: activating an indicator light to indicate a need for an air filter change.

19. The method of claim 12, further comprising: scenting the airflow passing though the air filter to add fragrance to areas surrounding the refrigerator.

* * * * *

UNITED STATES PATENT AND TRADEMARK OFFICE
CERTIFICATE OF CORRECTION

| | | |
|---|---|---|
| PATENT NO. | : 7,600,388 B2 | Page 1 of 1 |
| APPLICATION NO. | : 11/489561 | |
| DATED | : October 13, 2009 | |
| INVENTOR(S) | : William James Vestal | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Fifth Day of October, 2010

David J. Kappos
*Director of the United States Patent and Trademark Office*